(12) United States Patent
Healey

(10) Patent No.: US 6,377,515 B1
(45) Date of Patent: Apr. 23, 2002

(54) SYNCHRONIZED SONAR

(75) Inventor: Robert W. Healey, Tulsa, OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/632,527

(22) Filed: Aug. 4, 2000

Related U.S. Application Data

(60) Provisional application No. 60/149,405, filed on Aug. 16, 1999.

(51) Int. Cl.[7] ............................. G01S 7/52; G01S 15/96
(52) U.S. Cl. ........................................... 367/88; 367/87
(58) Field of Search .............................. 367/15, 21, 87, 367/88, 107, 910, 111; 375/356, 354

(56) References Cited

U.S. PATENT DOCUMENTS

| | | | | |
|---|---|---|---|---|
| 3,974,473 A | * | 8/1976 | Busch et al. | 367/91 |
| 4,521,893 A | * | 6/1985 | Bellman | 375/356 |
| 4,696,019 A | * | 9/1987 | Tulpule et al. | 375/356 |
| 5,525,081 A | | 6/1996 | Mardesich et al. | |
| 6,084,827 A | * | 7/2000 | Johnson et al. | 367/103 |

* cited by examiner

Primary Examiner—Ian J. Lobo
(74) Attorney, Agent, or Firm—Fellers, Snider, Blankenship, Bailey & Tippens, P.C.

(57) ABSTRACT

According to a preferred aspect of the instant invention, there is provided a synchronized sonar apparatus that is suitable for use when multiple sonar units are used in close proximity with each other. In a preferred embodiment, the instant invention reduces or eliminates interference between adjacent sonar units by electronically interconnected all of the sonar units and causing them to activate or "fire" at the same time. As a consequence, all of the units will also be "listening" for the returning reflections at the same time. Thus, cross-unit interference will be largely eliminated. Additionally, in another preferred embodiment there is provided a sonar system wherein the sonic sources are electronically interconnected and fired according to a predetermined timing rule, wherein the timing is chosen so that the firing transducers do not interfere with each other.

17 Claims, 2 Drawing Sheets

SYNCHRONIZED SONAR

RELATED APPLICATIONS

This application claims the benefit of U.S. provisional application serial No. 60/149,405, filed on Aug. 16, 1999, the disclosure of which is incorporated herein by reference.

FIELD OF THE INVENTION

The present invention relates to the general subject matter of detecting objects in water and, more particularly, to systems and methods locating fish or subsurface objects using boat-mounted sonar.

BACKGROUND OF THE INVENTION

The average fisherman or boater today is very familiar with conventional boat-mounted sonar devices of the sort most useful in recreational fishing and boating. These sorts of devices, conventionally referred to as "fish finders"or "depth sounders," have been available for some time and are designed to provide the user with a generalized image of the fish and underwater landscape/features proximate to the vessel. The avid fisherman can use these sorts of devices to locate schools of fish in the water beneath him, thereby increasing the chances that he will not leave empty-handed at the end of the day. Additionally, these devices can provide an estimate of the depth of the water, which is useful both for searching out potential fish habitats and for navigation.

In a typical configuration, the fish finder consists of two components: an underwater transducer and an on-board image display device, i.e., the sonar unit. The image display device might be as simple as a row of LED lights that indicate the distance to the water bottom or as complex as a screen (usually an LCD screen) that offers simultaneous multi-window presentations of system parameters and underwater views.

Conventionally, the image that is presented on the display device is based on the returned signals (echoes) produced in response to sonar transmissions. In a typical arrangement, the sonar originating device is a transducer that is mounted on the boat below the water line. When activated, the transducer radiates high-frequency sound energy into the water beneath the boat where it travels through the water until it encounters a density change, which change might be indicative of, for example, a fish, an underwater obstacle, the water bottom, a water temperature change, etc. When such a change is encountered at least part of the sonic energy that impinges on the target is reflected at the interface and returned toward the source. The returning signal is then detected and then manipulated for subsequent presentation on the display device for use by the fisherman.

The reflected signal is typically sensed as a function of the elapsed time between the origination of the signal and receipt of its returned reflection. Of course, given an approximate velocity of sonic energy in water, it is straight-forward and conventional to display the returning signal as a function of "depth", although in reality that conversion is only strictly appropriate for objects directly below the boat and transducer.

During operation, the transducer generates pulses of sound energy at regular intervals. This energy radiates downward (assuming, of course, that the transducer is oriented to point downward) and outward in a shape that is roughly conical. However, it is inevitable that some of this energy will "leak" horizontally. Additionally, the returning reflections are broadly dispersed and may be received away from their point of origination.

The foregoing presents a particular problem when multiple sonar devices are used in close proximity to one another. As a particular example, when two sonar devices are mounted on the same boat it can be difficult for either to operate normally because direct and reflected signals from one unit are received by the other. This causes artifacts in the form of clutter and false bottoms to appear on the display device of the receiving unit. In extreme cases, the two units can interfere with each other to the point of making both essentially useless.

Placing multiple sonar units on a single boat is particularly popular on larger boats (e.g., so that bow and stern views are both available) and on boats that carry multiple fishermen. In the later case, multiple fish finding units allow each boater to control the display parameters of his or her own unit. However, in these situations, such a collection of sonar units is often not practical because of interference from adjacent units.

Others have sought to solve the problem of interference caused by sonar units that are used in close proximity. For example, among the approaches that have been utilized in the past is modifying the transmitting frequencies of each transducer on the boat to make them widely separated from each other. Provided that the frequencies are separated sufficiently, this has the effect of making the signals from one unit largely undetectable by the other transducers. However, if the selected frequencies are so separated this modification changes the character of the transmitted and reflected ultrasonic wave, as different frequencies propagate and are absorbed or reflected differently. This will result in changes in the reflected waveform which may reduce the effectiveness of internal software that automatically looks for a certain reflected waveform when it detects and tracks reflections from the shore, water bottom, etc.

Thus, what is needed is an apparatus and method for allowing multiple fish sensing devices to be used in close proximity with each other without causing interference. The apparatus should allow all of the individual sonar units to operate at the same frequency, if that is desired.

Heretofore, as is well known in the recreation arts, there has been a need for an invention to address and solve the above-described problems. Accordingly, it should now be recognized, as was recognized by the present inventors, that there exists, and has existed for some time, a very real need for a device that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a preferred aspect of the instant invention, there is provided a synchronized sonar apparatus that is suitable for use when multiple fish finding units are used in close proximity with each other. In simplest terms, one preferred embodiment of the instant invention reduces or eliminates interference between adjacent units by causing all of them to activate or "fire" at the same time. As a consequence, all of the units will also be "listening" for the returning reflections at the same time. Thus, cross-unit interference is largely eliminated.

In more particular, according to a preferred embodiment of the instant invention there is provided a system which interconnects and synchronizes multiple same-frequency sonic sources so that each may operate without interfering with the others. The sonic sources are electronically synched so that they transmit like signals at the same time, thereby eliminating the interference that is caused by the asynchronous transmission and returning of signals generated by the other sonar devices.

According to another embodiment of the instant invention, there is provided a sonar system where the sonic sources are electronically connected and fired according to a predetermined timing rule, wherein the timing is chosen so that the firing transducers do not interfere with each other. By way of a first example, the transducers could be instructed to fire sequentially, with each transducer "waiting" a period of time at least equal to the two way transducer-to-water bottom travel time of the transducer that fired ahead of it, thereby allowing the signal from the previously-fired transducer to be recorded before a new signal is introduced into the water. Obviously, the time separation between firings could either be a fixed value or a value that is adaptively determined based on local water depths, temperatures, characteristics of the networked transducers, etc. As another example, the transducers could be timed to fire sequentially, but separated in time so that the down-going waves experience constructive interference, i.e., using the multiplicity of transducers to form a tuned array.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the a drawings. Rather, the invention is capable of other embodiments and of being practiced and carried out in various other ways not specifically enumerated herein. Additionally, the disclosure that follows is intended to cover all alternatives, modifications and equivalents as may be included within the spirit and scope of the invention as defined by the appended claims. Further, it should be understood that the phraseology and terminology employed herein are for the purpose of description and should not be regarded as limiting, unless the specification specifically so limits the invention. Further objects, features, and advantages of the present invention will be apparent upon examining the accompanying drawings and upon reading the following description of the preferred embodiments.

DETAILED DESCRIPTION OF THE PREFERRED EMBODIMENTS

According to a preferred aspect of the instant invention, there is provided a system and method for interconnecting and simultaneously using multiple sonar sources that are situated in close proximity with each other. In more particular, the instant invention synchronizes the activity of all of the transducers on a boat so that interference between them is dramatically reduced or completely eliminated.

Figure 1:
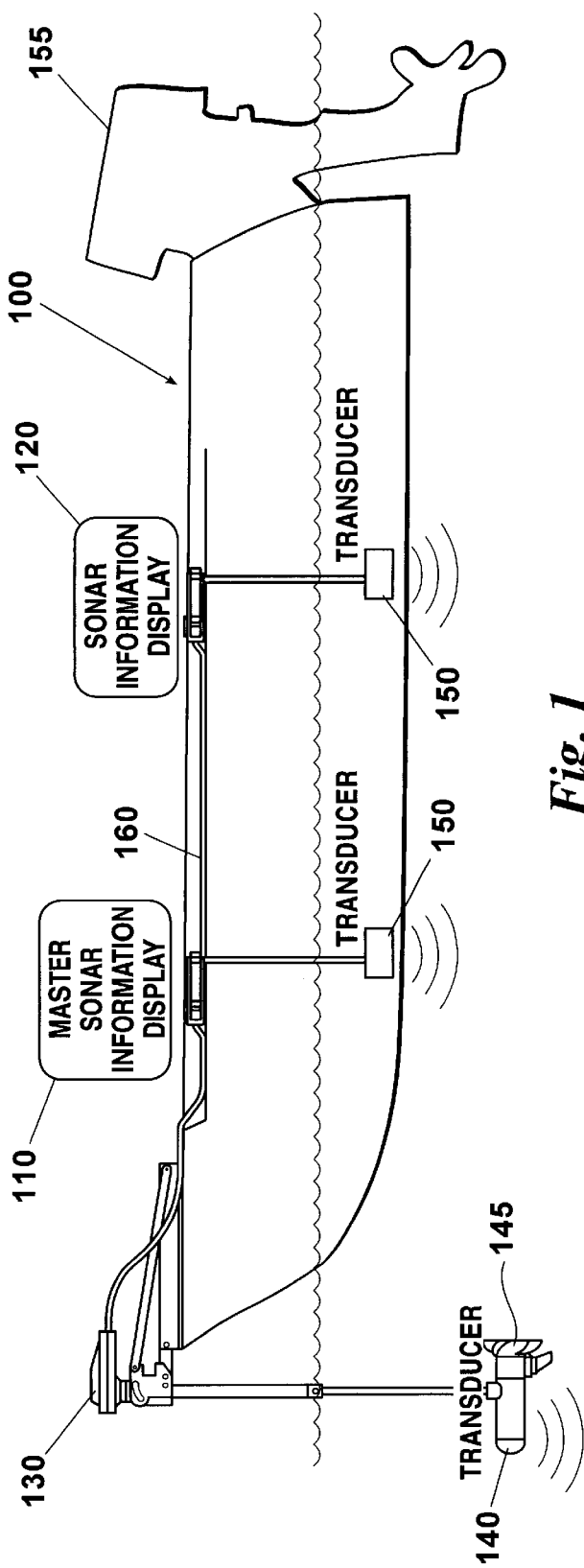
FIG. 1 illustrates the general environment of the instant invention.

Turning first to FIG. 1 wherein the general environment of the instant invention is illustrated, in the preferred environment it is anticipated that this invention will be mounted on a boat 100 for use in fishing and boating activities. Preferably, the boat will additionally be equipped with an electric trolling motor 145 which is used when it would be impractical or undesirable to use the outboard motor 155.

FIG. 1 illustrates some possible transducer mounting variants suitable for use with the instant invention. In some cases, the transducer 140 is mounted within the nose of trolling motor engine 145. Trolling motor head 130 might contain, for example, some sort of water depth display. Other arrangements include mounting the transducer 150 on the side or stern of the boat 100. In still other instances, the transducer is mounted onto (or through) the hull of the boat. Those skilled in the art will recognize that the transducers might be placed in many different positions and that the exact number and positioning of such transducers is not critical to the operation of the instant invention.

As is indicated in FIG. 1, it is conventional to have some sort of display device 110 or 120 associated with each transducer so that the returning signals therefrom can be viewed by the user. As is well known to those of skill in the art, the display devices 110 and 120 do more than just display data. Typically, devices similar to display devices 110 and 120 contain the computing power necessary to read, process, and format for display the returning signals from the transducers 150. In more particular, it is a common practice to include as part of the display 110 a microprocessor, RAM, and executable software that has been stored in nonvolatile memory such as ROM, PROM, etc.

Figure 2:
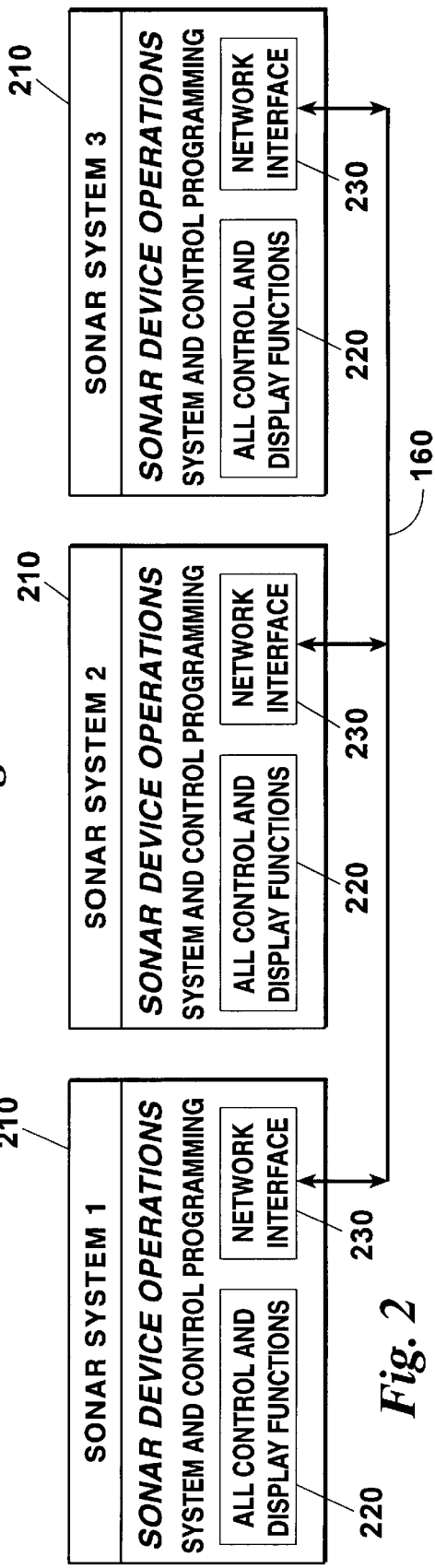
FIG. 2 contains a flow chart for a networked embodiment of the instant invention.

FIG. 2 indicates generally how multiple sonar systems are interconnected to operate according to the teachings of the instant invention. As is indicated in that figure, the operations of each generalized sonar system 210 may be described in terms of two broad functional units. First, the control and display function block 220 represents the hardware and software necessary to pulse the transducer, detect the returning signal, process or condition the returning signal, and display the returning signal on display device 110 or 120 according to the parameters selected by a user. This much of the system is conventional.

Additionally, and critical to the operation of the instant invention, to each sonar system 210 has been added a network interface 230 which provides a communications connection through which the other sonar systems 210 may be contacted. In the preferred embodiment, communications link 160 interconnects the sonar systems and takes the form of an RS485 multi-drop communication channel. However, it should be noted that the terms "communications link", "communications conduit", etc., should be understood in their broadest sense to include any sort of physical/direct electrical connection or pathway, as well as wireless communications schemes such as infrared, ultrasonic, RF, microwave, etc.

In the preferred embodiment, the RS485 multi-drop communication channel 160 is used to pass signals continuously between the sonar devices that so that they can be synchronized during firing. Additionally, it is preferred that the communications between the sonar devices 210 include the exchange of additional information beyond just synchronization instructions including, by way of example, information having to do with setup parameters of each device, keyboard presses, display functions, etc.

To insure coordination of the transducer firings, one of the sonar devices 210 will preferably be instructed to assume the role of a "master" sonar unit or master controller (or just "master", hereinafter). The end-user may or may not be given control over which device is to be the master. The master controller need not be any particular sonar system 210 in the network, although it is certainly possible, and has been specifically contemplated by the instant inventor, that preference might be given to certain sonar models over others. However, in the preferred embodiment any sonar system 210 will have an equal opportunity to become the master although, practically speaking, the master will typically be the first unit in the network to be powered up.

In brief, the function of the master controller is to orchestrate the firing of all of the transducers on the network so that they preferably transmit simultaneously. The other non-master sonar devices (i.e., "slaves") in turn are programmed to submit to the authority of the master controller and to only activate their respective transducers when instructed to do so by the master. The master preferably instructs the slave sonar units to activate their associated transducers by broadcasting a "start transmit" signal or command across the network. Receipt of this instruction by the CPU of the slaves then results in the firing of any transducer controlled thereby. Thus, simultaneous activation of all of the networked transducers is assured. Since the communication described previously is preferably designed to be interrupt driven, all of the networked sonar units receive the command at the same time and they activate their associated transducers simultaneously. Of course, those skilled in the art will recognize how such inter-CPU communications might be designed to be interrupt driven or not.

Figure 3:
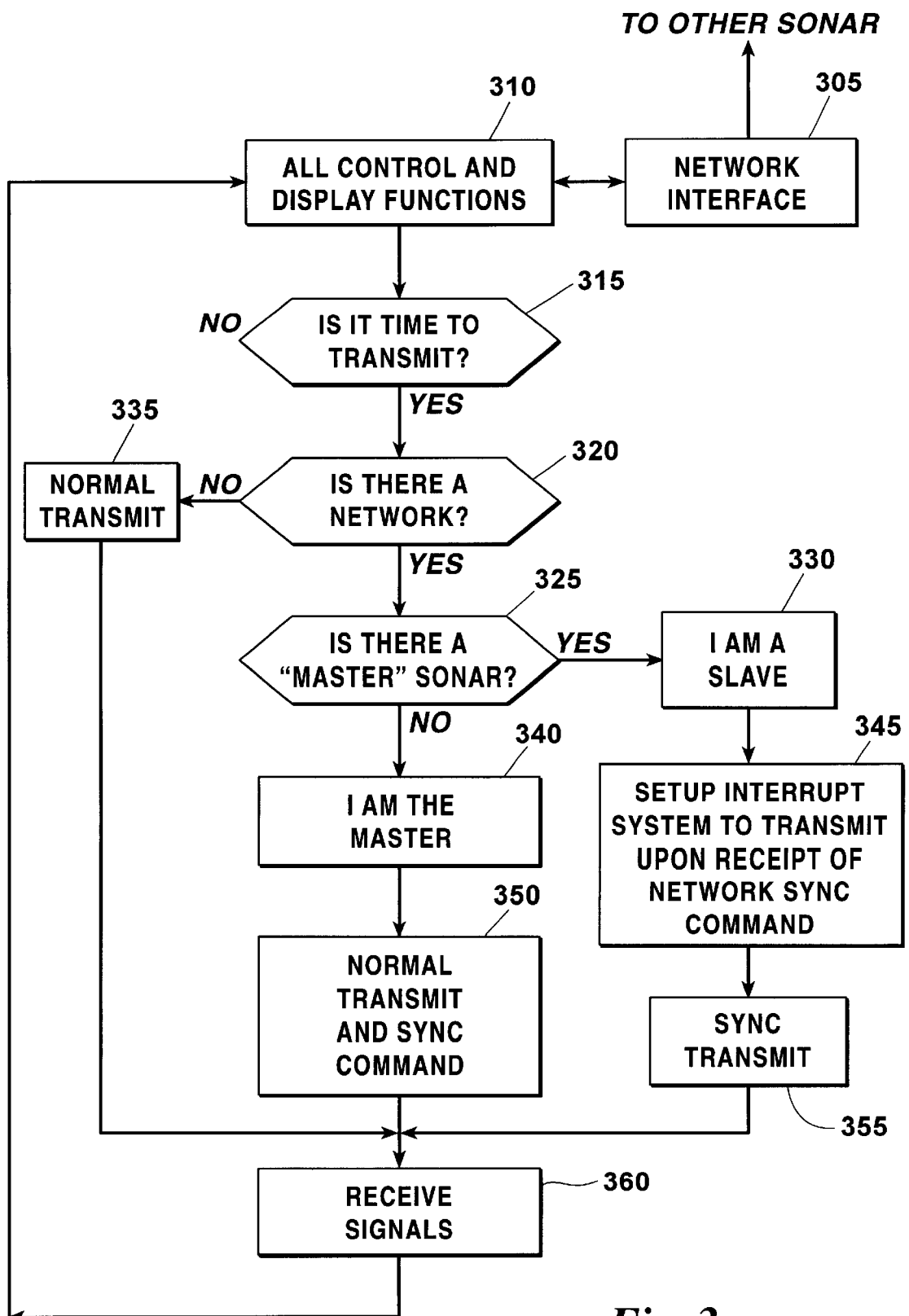
FIG. 3 is a flow chart of a preferred synchronized transmission logic.

FIG. 3 illustrates a preferred control logic for use with the instant invention. As is illustrated in that figure, the standard sonar system control and display functions are performed during step 310, which step is preferably dependent at least in part on parametric input from the user. Monitoring the network interface 305 is also preferably performed during this step and, as described previously, communications which arrive via the network interface 305 are preferably given interrupt priority.

The logic that controls synchronization of the transducers is implemented by steps 315 to 360. As is indicated in FIG. 3, during normal operations the CPU within the each sonar unit will determine whether it is time to activate the transducer. This determination might be based, for example, on the elapsed time since the last transducer firing. This would be the case where the logic of FIG. 3 is being executed within the master controller. On the other hand, if this logic is being performed within a slave sonar system, receipt of a "start transmit" signal would be the signal that it is time to transmit. Of course, if it is not yet time to transmit, the CPU would be expected to return to its wait-time tasks, including monitoring the sonar device for user input and processing and displaying returned sonic images.

If it is time to transmit, a next preferred step is to determine whether the instant sonar system is a part of a network (step 320). If not, this sonar unit is free to activate its transducer (step 335) and sense the returning signal (step 360) as usual. However, if the CPU determines that the instant sonar unit is part of a network, a next preferred step is to ascertain whether or not there is currently a "master" sonar unit on the network (step 325). If it is determined that there is currently no master controller—as might be the case if the sonar unit were the first one on the network to be powered up—the instant sonar unit preferably assumes the role of "master" (step 340) and thereafter will control the firing of any sonic units that are subsequently added to the system.

In the case that the instant sonic unit is the master, a next preferred step is to activate its associate transducer and transmit the sync command (i.e., the "start transmit" command) to every other sonar device on the network (step 350). After all of the associated transducers have fired, the returning signals will be sensed (step 360) and passed to the standard control program for subsequent processing and display (step 310).

If the unit determines at step 325 that there is already a "master" sonar unit on the system, the instant sonar unit will preferably then determine that it is a "slave" unit (step 330) and configure itself accordingly (step 345), such configuration would preferably include setting up the interrupt system so that the instant unit would be prepared to transmit upon receipt of the appropriate command from the master unit, assuming, of course, that such setup had not been done previously. Then, the "slave" will activate its sonar transducer in sync with the others in the network.

After the incoming signal has returned, in each case control returns to the control/display portion of the sonar units internal software (step 310) where normal system functions are performed.

Finally, if the "master" sonar unit is removed from the system, in the preferred embodiment the remaining units will decide among themselves who will be the replacement master. This might be done in any number of ways, but some preferred embodiments include (1) selecting the unit on the network with the highest operating system revision to be the new master; (2) selecting the unit on the network with the lowest operating system revision to be the new master (i.e., choosing the least-common-denominator); and, (3) choosing the unit that has been active on the instant network the longest to be the new master. Of course, many variations are possible and have been specifically contemplated by the instant inventor.

One clear advantage of the approach of the instant embodiment is that—in addition to attenuating cross-unit noise contamination—implementation of the instant method can actually improve the quality of the returned signal. This is because firing all of the transducers on the boat at the same time has the effect of putting more sonic energy into the water than would be possible from the firing of any single transducer: in effect, an array of sonic sources is activated each time there is a synchronized firing. All of the resulting sonic energy propagates through the water at the same speed, reflects off of targets at the same depths, and then is sensed in each receiver as though all of this energy was emitted from a single source/source-array. This will be especially true where the sonic transducers are all operating at the same frequency, which would be impractical in other systems.

According to another preferred embodiment, there is provided a synchronized sonar system substantially as described above, but wherein the sonic sources are electronically interconnected and fired according to a predetermined timing rule. The timing rule could call for all of the transducers to be activated simultaneously as has been described previously or, more generally, the rule might call for the transducers be fired according to a predetermined pattern, which pattern has been selected so that the interference between transducers is minimized.

As a first example, consider the rule that first the transducers sequentially, with each transducer "waiting" a period of time at least equal to the two way transducer-to-water bottom travel time of the transducer that fired ahead of it, thereby allowing the signal from the previously-fired transducer to be recorded before a new signal is introduced into the water. That is, if the water depth is 30' the two-way travel time from the surface to the water bottom (assuming a water velocity of 4,800 f/s) would be about 0.01 seconds. Thus, if a first transducer is allowed to fire, that transducer will be able to receive its returning echo without interference as long as no other transducer fires for 0.01 seconds. After the expiration of 0.01 seconds, the next transducer can be fired, etc. In this fashion, a large number of synchronized transducers may be operated without interfering with each other. Of course, the time interval that separates transducer filings (0.01 seconds in the instant example) may be either determined in advance or, preferably, adaptively determined based on the current water depth as measured by transducers on the boat. One disadvantage of this approach is that if there are several transducers, each individual transducer will be fired fewer times per second than might be otherwise desired. However, using the instant approach each such firing will potentially produce useful data uncorrupted by energy from adjacent transducers.

Another variant of the previous approach would be to fire the transducers sequentially—either individually or in groups—but at closely spaced intervals, e.g., firings separated by a few milli-seconds. This method of staged transducer firing could be used to create a tuned array of sources, whereby imperfections in the signal source could be ameliorated and/or the bottom could be more accurately imaged. Additionally, if the transducer network consisted of transducers of varying strengths and frequencies, it would be possible, using techniques well known to those in the signal processing arts, to construct a firing timing that would exploit the particular combination of transducers employed.

Thus, for purposes of the instant disclosure, the term "synchronized" should be interpreted in its broadest sense to include simultaneous firing, as well as timed/patterned firing of the associated transducers according to a particular rule or pattern.

Further, it should be noted that although the language of the previous text has been generally couched in terms of down-firing transducers, it should be noted that more generally the apparatus and methods suggested herein would also be applicable to side-firing transducers as well. Additionally, although the instant disclosure has spoken in terms of transducers for use in "fish finding", those skilled in the art will recognize that the same technology is also applied to shore tracking and underwater object location (e.g., "stump" finding), etc.

Still further, although in the preferred embodiment there will be a single "master" unit that controls the firing of all of the other units, that is not strictly required for the operation of the instant invention. According to another embodiment of the instant invention, there is provided a networked sonar system substantially as described above, but wherein the sonar units are connected together as "peers". As an example of how this would work in the context of the instant invention, a sonar unit would begin by broadcasting a signal over the network informing the others that it is about to fire. The other units would then remain silent, allowing the signaling unit to fire and receive its returned echo without interference. After the returning signal has been sensed, the firing unit would then send an"all clear" signal over the network to the other units, which signal indicates that another unit may then fire its transducer, and so on. Obviously, there would need to be some provision made to insure that each sonar unit was given its "turn," but methods for doing that are well known to those of ordinary skill in the art. Thus, where the sonar units are formed from a networked collection of peers, there need not be a permanent "master", but rather each unit in the system, in turn, temporarily assumes that role so that it may fire its transducer without interruption.

In another variant of the previous embodiment, it is possible to orchestrate the simultaneous firing of sonar units connected together in a peer-based system. According to a preferred embodiment of this variation, the first unit that is active on the network will establish a "beat" or transducer firing frequency. Then, as additional sonar units are added to the network, each new unit will preferably sense the established firing frequency and adapt itself to fire in synchronization. Further, if the beat-establishing unit is taken off-line, the remaining units would then preferably arbitrate among themselves to select which instrument will perform the task of "beat setting".

Thus, for purposes of specificity in the claims that follow, the term "master" will be used in its broadest sense to refer to either a permanent master or a peer-to-peer network of sonar units, wherein each unit becomes the "master" in turn. In the later case, that necessarily means that the non-firing units are, at least temporarily, all "slave" units for at least the period of time during which the firing unit is awaiting its reflected signal. Additionally, the term "master" sonar unit should be broadly construed to cover those situations in which multiple interconnected sonar units function together as the "master" for the network. Further, the master unit might or might not have a transducer attached thereto, but might instead be a special purpose piece of hardware whose primary function is to synchronize the firing of any sonar units that are networked to it. Similarly, the master unit need not have a conventional sonar display screen, and this is especially true where the master is configured to be a stand-alone piece of controlling hardware.

Finally, it should be noted that the instant inventor prefers that the master and slave sonar units maintain a continuing dialog across the network. Thus, it is envisioned that a number of synchronization-related signals, commands, instructions, etc., might be exchanged between the interconnected sonar units. These commands would preferably include a "start transmit"command, together with other commands such as "sync" and "wait".

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A synchronizing sonar apparatus for use in recreational fishing and boating, comprising:
   (a) a master sonar unit,
      said master sonar unit having at least one master sonar unit transducer associated therewith,
         each master sonar unit transducer being fired under the control of said master sonar unit, and,
      said master sonar unit being configurable to transmit at least a synchronization signal;
   (b) at least one slave sonar unit positionable to be in communication with said master sonar unit, wherein each of said slave sonar units is responsive at least to said transmitted synchronization signal from said master sonar unit, and, wherein each of said slave sonar units has at least one transducer associated therewith, each associated transducer being fired under the control of said associated slave sonar unit;

(c) communications means linking said master sonar unit and each of said at least one slave sonar units, said communications means being at least for conveying said transmitted synchronization signal from said master sonar unit to said at least one slave sonar units.

2. An apparatus according to claim 1, wherein at least one of said synchronization signals is a command to activate all of said associated slave transducers at a same particular instant of time.

3. An apparatus according to claim 1, wherein said communications means is an RS485 multi-drop communication channel.

4. An apparatus according to claim 1, wherein said communications means is selected from a group consisting of infrared, ultrasonic, RF, and, microwave.

5. A method of operating a plurality of sonar units in close proximity, wherein is provided the apparatus of claim 1, comprising the steps of:

(a) transmitting from said master sonar unit to each of said slave sonar units a synchronization signal; and, (b) firing according to a predetermined firing rule each of said associated slave transducers and said associated master sonar unit transducers.

6. A method according to claim 5, wherein step (b) includes the step of firing all of said associated slave transducers and said associated master sonar unit transducers are simultaneously.

7. A method according to claim 5, wherein step (b) includes the step of firing each of said associated slave transducers and said associated master sonar unit transducers separately in a spaced apart timing relationship.

8. A synchronized sonar apparatus for use in recreational fishing and boating comprising:

(a) a master unit being configurable to transmit synchronization signals, said master unit positionable in a recreational boat;

(b) a plurality of slave sonar units, wherein each of said slave sonar units is responsive at least to said transmitted synchronization signals from said master unit, and, wherein each of said slave sonar units has at least one transducer associated therewith each associated transducer being affixed to said recreational boat and fired in response to signals from said associated slave sonar unit;

(c) communications means linking said master unit and each of said at least one slave sonar units, said communications means being at least for conveying said transmitted synchronization signals from said master unit to said slave units.

9. An apparatus according to claim 8, wherein said master unit has at least one master unit transducer in communication therewith, each such master unit transducer being fired in response to a firing signal from said master unit.

10. An apparatus according to claim 8, wherein said master unit is a master sonar unit.

11. A synchronized sonar apparatus for use in recreational fishing and boating, comprising:

(a) a plurality of sonar units, each of said plurality of sonar units having at least one transducer associated therewith and controlled thereby, wherein each of said plurality of sonar units is positionable to be in communication with all of the other sonar units, wherein at least one of said plurality of sonar units is configurable to be a master sonar unit, said master sonar unit being at least configurable to transmit a synchronization signal to each other said sonar unit, and, each other said sonar unit being adaptable to receive said synchronization signal and fire said associated at least one transducer in response thereto; and, (b) a communications conduit linking each of said plurality of sonar units, said communications conduit at least for the transmission of said synchronization signal from said master sonar unit to each of said other sonar units.

12. An apparatus according to claim 11, wherein all of said plurality of sonar units are configurable to be a master sonar unit, and wherein only one of said plurality of sonar units is permitted to be said master sonar unit at any one time.

13. A method for synchronizing sonar units for use in recreational fishing and boating, wherein there is provided a plurality of sonar units, each of said sonar units having at least one transducer controlled thereby, comprising the steps of:

(a) interconnecting each of said sonar units with a communications conduit;

(b) selecting a firing rule;

(c) selecting a master sonar unit from among said plurality of sonar units;

(d) transmitting a synchronization signal from said master sonar unit to each of said other sonar units via said communications conduit; and, (e) firing said controlled transducers based on said synchronization signal and according to said selected firing rule.

14. A method according to claim 13, wherein at least steps (d) and (e) are repeated at least once.

15. A method according to claim 13, wherein steps (c) through (e) are repeated at least once.

16. A method according to claim 13, wherein said firing rule specifies that all of said controlled transducers are to be fired at once, and wherein step (e) includes the steps of:

(e1) simultaneously firing all of said controlled transducers a predetermined time after receipt of said synchronization signal.

17. A method according to claim 13, wherein said firing rule specifies that each of said controlled transducers is to be fired separately, and wherein step (e) includes the steps of:

(e1) sequentially firing each of said controlled transducers a different predetermined time after receipt of said synchronization signal.

* * * * *